US012755020B2

(12) United States Patent
Oh et al.

(10) Patent No.: US 12,755,020 B2
(45) Date of Patent: Oct. 6, 2026

(54) ELECTRONIC DEVICE AND APPLICATION PACKAGE MANAGEMENT METHOD

(71) Applicant: Samsung Electronics Co., Ltd., Suwon-si (KR)

(72) Inventors: Myeongjin Oh, Suwon-si (KR); Moonkyung Kim, Suwon-si (KR); Dongwook Seo, Suwon-si (KR); Seyeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 18/622,182

(22) Filed: Mar. 29, 2024

(65) Prior Publication Data

US 2024/0241961 A1 Jul. 18, 2024

Related U.S. Application Data

(63) Continuation of application No. PCT/KR2022/014550, filed on Sep. 28, 2022.

(30) Foreign Application Priority Data

Nov. 15, 2021 (KR) ........................ 10-2021-0156913
Dec. 28, 2021 (KR) ........................ 10-2021-0189602

(51) Int. Cl.
*G06F 21/00* (2013.01)
*G06F 21/57* (2013.01)

(52) U.S. Cl.
CPC .................................. *G06F 21/572* (2013.01)

(58) Field of Classification Search
None
See application file for complete search history.

(56) References Cited

U.S. PATENT DOCUMENTS 8,387,141 B1 2/2013 Zhukov et al.
10,353,686 B1 * 7/2019 Pasha ...................... H04L 67/34
(Continued)

FOREIGN PATENT DOCUMENTS

CN 110377333 A 10/2019
CN 111177715 A 5/2020
(Continued)

OTHER PUBLICATIONS

Liu, Zhenyu et al. Research on software security and compatibility test for mobile application. Fourth edition of the International Conference on the Innovative Computing Technology (Intech 2014). https://ieeexplore.ieee.org/stamp/stamp.jsp?tp=&arnumber=6927764 (Year: 2014).*
(Continued)

*Primary Examiner* — Jeremiah L Avery
(74) *Attorney, Agent, or Firm* — Nixon & Vanderhye, P.C.

(57) ABSTRACT

An electronic device according to various embodiments comprises: a communication interface comprising communication circuitry, memory, and at least one processor comprising processing circuitry. The memory storing instructions which, when executed by the processor, cause the electronic device to acquire first identification information written on an application package during an application package generation process; acquire second identification information that can have a different value according to the download route of the application package; generate authentication information based on the first identification information and the second identification information; and control the installation of the application based on the authentication information.

20 Claims, 10 Drawing Sheets

(56) References Cited

U.S. PATENT DOCUMENTS

| | | | | |
|---|---|---|---|---|
| 2007/0087765 | A1 | 4/2007 | Richardson et al. | |
| 2011/0244830 | A1 | 10/2011 | Chesnutt et al. | |
| 2012/0272072 | A1 | 10/2012 | Lee et al. | |
| 2013/0326500 | A1 | 12/2013 | Park et al. | |
| 2014/0109082 | A1 | 4/2014 | Kimmet et al. | |
| 2015/0106871 | A1 | 4/2015 | Lim | |
| 2016/0239287 | A1* | 8/2016 | Lim | G06F 3/04842 |
| 2016/0321452 | A1* | 11/2016 | Richardson | H04W 12/12 |
| 2019/0004782 | A1* | 1/2019 | Maruyama | G06F 16/955 |
| 2019/0391800 | A1* | 12/2019 | Lin | G06F 8/65 |
| 2020/0042693 | A1 | 2/2020 | Galpin et al. | |
| 2020/0145515 | A1* | 5/2020 | Fleck | H04L 67/30 |
| 2020/0285752 | A1* | 9/2020 | Wyatt | G06F 21/566 |
| 2021/0048994 | A1* | 2/2021 | Yu | G06N 3/088 |
| 2021/0318888 | A1* | 10/2021 | Abbasian | G06F 11/302 |

FOREIGN PATENT DOCUMENTS

| | | | |
|---|---|---|---|
| EP | 1826982 | A1 | 8/2007 |
| KR | 100391168 | B1 | 7/2003 |
| KR | 101498820 | B1 | 3/2015 |
| KR | 20150056244 | A | 5/2015 |
| KR | 101648402 | B1 | 8/2016 |
| KR | 101751227 | B1 | 6/2017 |
| KR | 101895876 | B1 | 9/2018 |
| KR | 102003850 | B1 | 7/2019 |
| KR | 102201218 | B1 | 1/2021 |
| WO | 2013063791 | A1 | 5/2013 |

OTHER PUBLICATIONS

Ke, Wang et al. An Enterprise Computing System Based on Software-Enrollment Strategy. 2009 International Forum on Computer Science-Technology and Applications. https://ieeexplore.ieee.org/stamp/stamp.jsp?tp=&arnumber=5384995 (Year: 2009).*

Jun-Jun, Wu et al. A Secure Software Download Framework Based on Mobile Trusted Computing. 2009 Second International Workshop on Computer Science and Engineering. https://ieeexplore.ieee.org/stamp/stamp.jsp?tp=&arnumber=5403265 (Year: 2009).*

International Search Report for PCT/KR2022/014550 mailed Jan. 20, 2023, 5 pages.

Written Opinion of the ISA for PCT/KR2022/014550 mailed Jan. 20, 2023, 4 pages.

Office Action dated May 28, 2026 in Korean Application No. 10-2021-0189602 with English translation.

* cited by examiner

ELECTRONIC DEVICE AND APPLICATION PACKAGE MANAGEMENT METHOD

CROSS-REFERENCE TO RELATED APPLICATIONS

This application is a continuation of International Application No. PCT/KR2022/014550 designating the United States, filed on Sep. 28, 2022, in the Korean Intellectual Property Receiving Office and claiming priority to Korean Patent Application Nos. 10-2021-0156913, filed on Nov. 15, 2021, and 10-2021-0189602, filed on Dec. 28, 2021, in the Korean Intellectual Property Office, the disclosures of each of which are incorporated by reference herein in their entireties.

BACKGROUND

Field

The disclosure relates to an electronic device, and for example, to an electronic device including an application package and a method of managing an application package thereof.

Description of Related Art

With the development of mobile communication technology and processor technology, mobile terminal devices (hereinafter, electronic devices) have come to have various functions beyond the conventional call function. Various functions of electronic devices may include, for example, a camera function, a multimedia playback function, and execution of various applications, and in order to perform these various functions, the electronic devices are equipped with high-end hardware and software, and accordingly, the cost of the electronic devices is increasing.

Manufacturers and telecommunication companies of electronic devices may provide various services using identification information of the electronic devices. For example, the firmware or operating system of the electronic device may be updated with a wireless method such as over the air (OTA).

Android applications may be propagated and installed through various paths. An Android policy of allowing these various sources may have advantages such as convenience in development and business flexibility, but an unintended installation path of a developer (seller) may make it difficult to protect assets of an android application package (APK) and result in damaging the security of a terminal. In Android, it is easy to extract an original android application package (APK) installed in the terminal; thus, the extracted android application package (APK) may be reinstalled through various paths. In this case, because a designated distribution channel cannot be guaranteed, it may become difficult for the developer (seller) to respond to the leakage and distribution of the android application package (APK). Further, because a designated distribution channel cannot be guaranteed, a charging system for paid apps may be complicated.

When an android application package (APK) under development may be uploaded and distributed on a specific website, it may result in leakage of key information on the application, resulting in serious asset infringement.

SUMMARY

According to various example embodiments, an electronic device may include: a communication interface including communication circuitry; a memory; and at least one processor, comprising processing circuitry, wherein at least one processor, individually and/or collectively, may be configured to: acquire first identification information written on an application package in a process of creating the application package, acquire second identification information that may have different values according to a download path of the application package, generate authentication information based on the first identification information and the second identification information, and control installation of an application based on the authentication information.

According to various example embodiments, a method of managing an application package for an electronic device may include: acquiring first identification information written on the application package; acquiring second identification information that may have different values according to a download path of the application package; generating authentication information based on the first identification information and the second identification information; and controlling installation of an application based on the authentication information.

According to various example embodiments, a developer (seller) can effectively configure an installation path for an android application package (APK) in advance using an electronic device and an application package management method. When the android application package (APK) is distributed only in places designated by the developer, android application package (APK) assets can be protected in a current Android system that may extract an original android application package (APK) from the terminal.

Further, an action of extracting and distributing the original android application package (APK) within the terminal can be blocked in advance, and charges can be calculated by accurately measuring the number of downloads of paid applications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
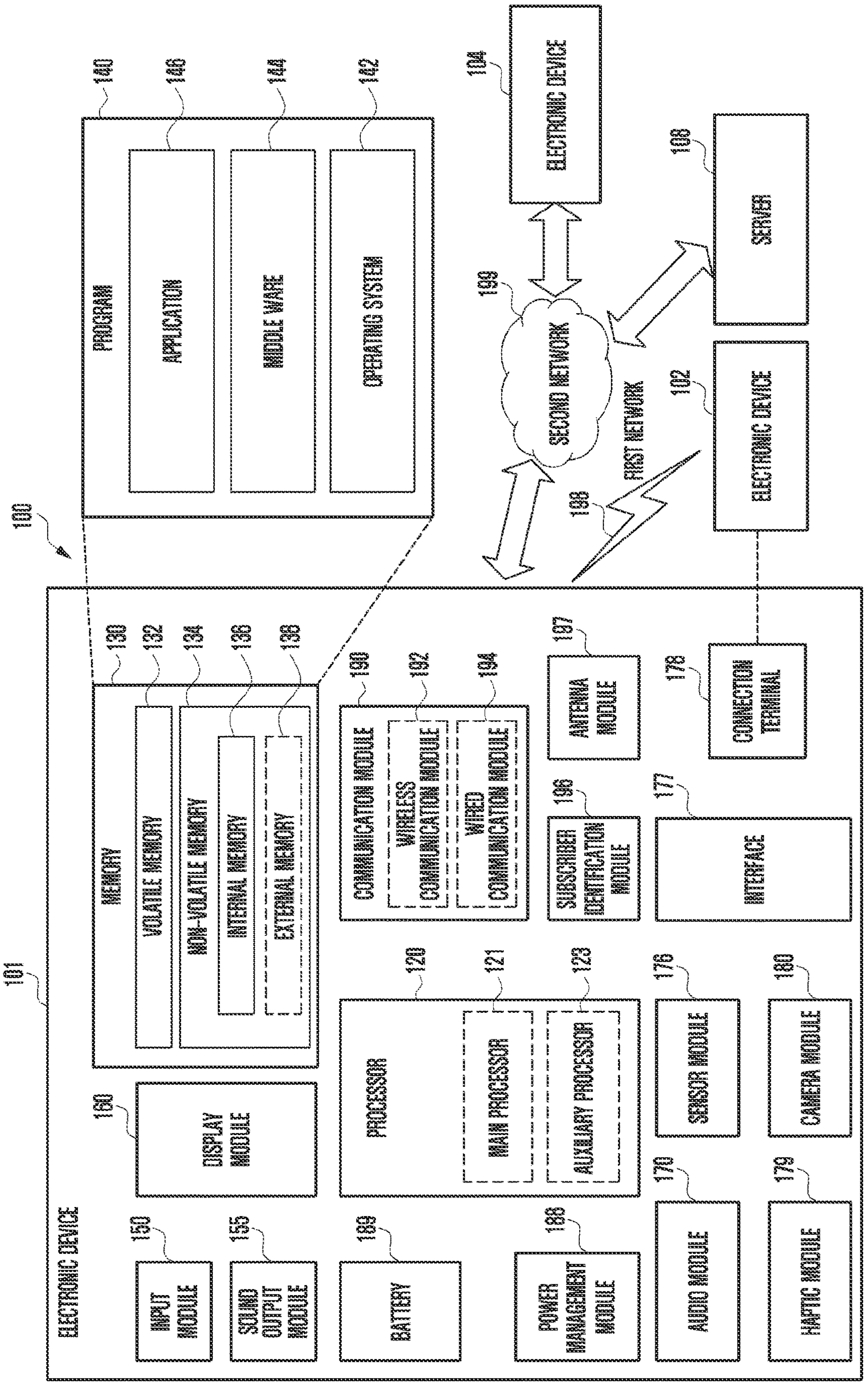
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
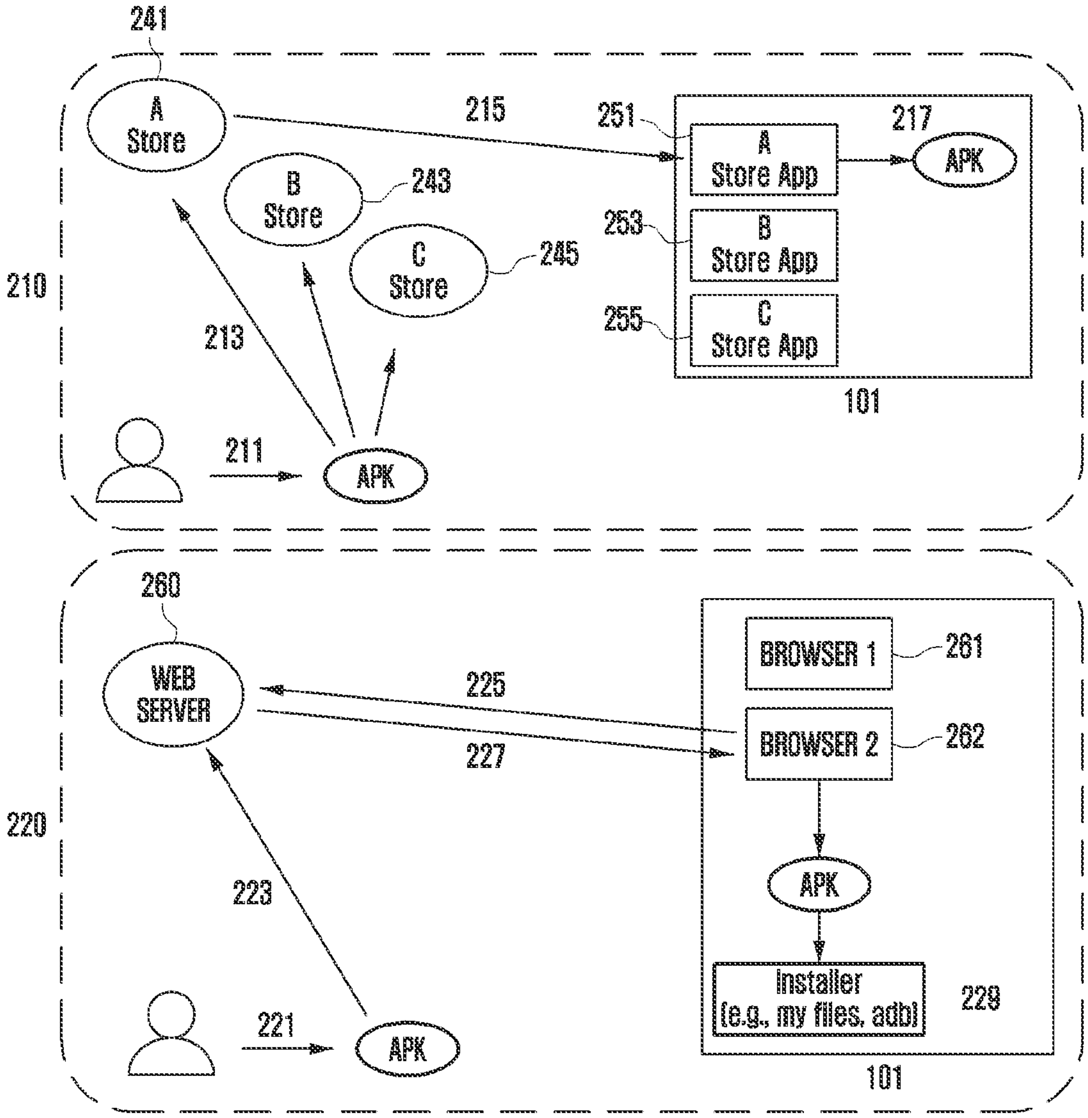
FIGS. 2A and 2B are diagrams illustrating an example application distribution process according to a comparative example.
Figure 2B:
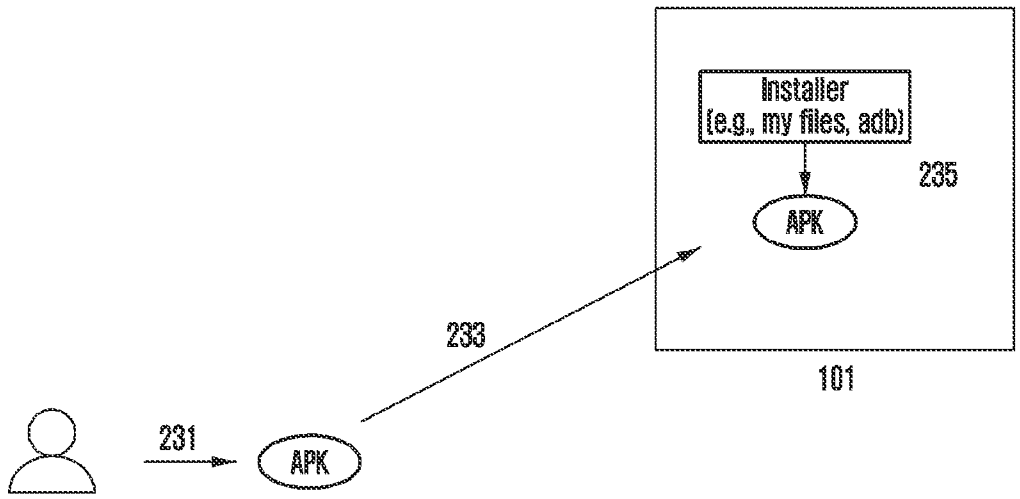

FIGS. 2A and 2B are diagrams illustrating example application distribution processes according to a comparative example.

According to an embodiment, an application may be installed in a terminal through various paths. A developer may create an android application package (APK) file and transmit the application package to a user's electronic device 101 using various means. The user's electronic device 101 may include a structure and/or function of the electronic device 101 previously described with reference to FIG. 1.

For example, as illustrated in 210 of FIG. 2A, an application developed by the developer may be uploaded using at least one store. In operation 211, an android application package (APK) may be created during an application development process. Thereafter, in operation 213, the android application package (APK) may be uploaded onto at least one store (e.g., store A 241, store B 243, and store C 245). In operation 215, the electronic device 101 may download an application using at least one store (e.g., store A 241, store B 243, and store C 245). In operation 217, the electronic device 101 may install the application package file therein using a store application (e.g., store A application 251, store B application 253, and store C application 255) in which an application is downloaded. In this case, the store application (e.g., store A application 251, store B application 253, and store C application 255) used in the installation process may be referred to as an installer.

As illustrated in 220 of FIG. 2A, the application may be uploaded using a specific server (e.g., web server 260) rather than the store. In this case, the specific server may include the developer's own server, but it is not limited thereto. In operation 221, the android application package (APK) may be created as an application during a development process. Thereafter, in operation 223, the android application package (APK) may be uploaded onto at least one server (e.g., web server 260). The android application package may be registered on at least one server (e.g., the web server 260). In operation 225, the electronic device 101 may request an application file to a server (e.g., web server 260) configured by the developer. In operation 227, the server (e.g., web server 260) that has received the request may control the electronic device 101 to download the application. Thereafter, in operation 229, the electronic device 101 may install the downloaded application package file within the terminal using a link (e.g., first browser 261 or second browser 262).

According to an embodiment, the electronic device 101 may request an application file to a server configured by the developer. The server that has received the request may control the electronic device 101 to download the application. After downloading the application, the electronic device 101 may share a download completion status of the application with the user, identify whether the application is installed, and install or delete the application package within or from the terminal corresponding to the user's selection (e.g., identifying or canceling the application installation using a touch input).

With reference to FIG. 2B, in operation 231, the android application package (APK) may be separately extracted or created from the application. In operation 233, the electronic device 101 may download the application using at least one store (e.g., store A 241, store B 243, and store C 245) or at least one server (e.g., web server 260). In operation 235, the electronic device 101 may install the application package file therein using the store application (e.g., store A application 251, store B application 253, and store C application 255) or the link (e.g., first browser 261, second browser 262) in which the application is downloaded.

Due to the nature of the Android environment that allows side loading, the electronic device 101 may receive an application package (APK) through a server not uploaded or intended by the developer, and install the application using the received application package. Side loading may refer, for example, to an action of downloading an application through a path not intended by the application developer. In this case, the Android policy that allows various sources may serve as advantages such as ease of development and business flexibility, but may make it difficult to protect assets of the android application package (APK) due to an installation path unintended by the developer (seller) and result in damaging the security of the electronic device 101.

An electronic device according to various embodiments according to the disclosure may control the developer to directly configure a distribution source of the android application package (APK) inside the android application package (APK), and compare a source configured by the developer and an actual installation path of the application to control installation of the application. Further, in the case that the electronic device blocks installation of an application, the electronic device may guide the reason for blocking to the user. Hereinafter, a constitution of such an electronic device and a method of managing an application package for the electronic device will be described.

Figure 3:
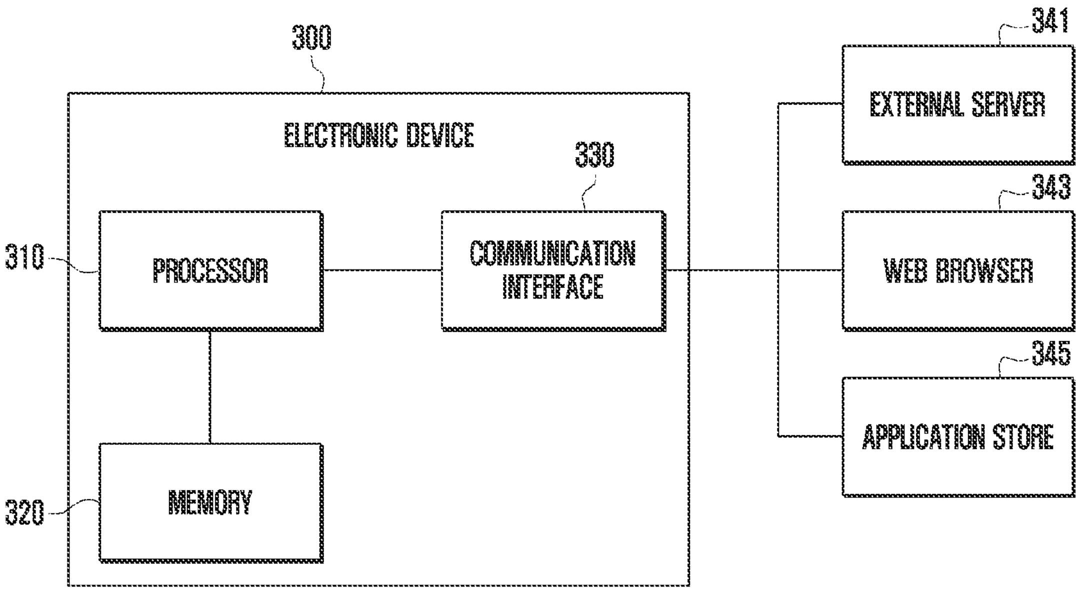
FIG. 3 is a block diagram illustrating an example configuration of an electronic device according to various embodiments.

FIG. 3 is a block diagram illustrating an example configuration of an electronic device according to various embodiments.

According to various embodiments, an electronic device 300 may include a processor (e.g., including processing circuitry) 310, a memory 320, and a communication interface (e.g., including communication circuitry) 330, and some of the illustrated components may be omitted or replaced. The electronic device 300 may further include at least some of the components and/or functions of the electronic device 101 of FIG. 1. At least some of the illustrated (or not illustrated) components of the electronic device may be operatively, functionally, and/or electrically connected to each other.

According to various embodiments, the processor 310 may include various processing circuitry capable of performing calculation or data processing related to control and/or communication of each component of the electronic device 300, and may include one or more processors. The processor 310 may include at least some of the components and/or functions of the processor 120 of FIG. 1. For example, the processor 310 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to various embodiments, there will be no limitation to calculation and data processing functions in which the processor 310 may implement on the electronic device, but hereinafter, features related to an operation of controlling an installation process of the application using source information in the android application package (APK) will be described in detail. Operations of the processor 310 may be performed by loading instructions stored in the memory 320.

According to various embodiments, the electronic device 300 may include one or more memories 320, and the memory 320 may include a main memory and storage. The main memory may include a volatile memory such as a dynamic random access memory (DRAM), static RAM (SRAM), or synchronous dynamic RAM (SDRAM). Alternatively, the memory 450 is a non-volatile memory and may include a large capacity storage device. The storage may include at least one of a one time programmable ROM (OTPROM), PROM, EPROM, EEPROM, mask ROM, flash ROM, flash memory, hard drive, or solid state drive (SSD). The memory 320 may store various file data, and the stored file data may be updated according to the operation of the processor 310.

According to various embodiments, the communication interface 330 may include various communication circuitry and perform a wired or wireless interface function for transmitting and receiving data to and from an external device. The communication interface 330 may download a file (e.g., android application package (APK)) related to an application from at least one of an external server 341, a web browser 343, or an application store 345. In this case, unlike the application store 345, the web browser 343 may not be installed in the electronic device 300, and it may be understood that the web browser 343 is included in the external server 341 or is a type of the external server 341.

Figure 4:
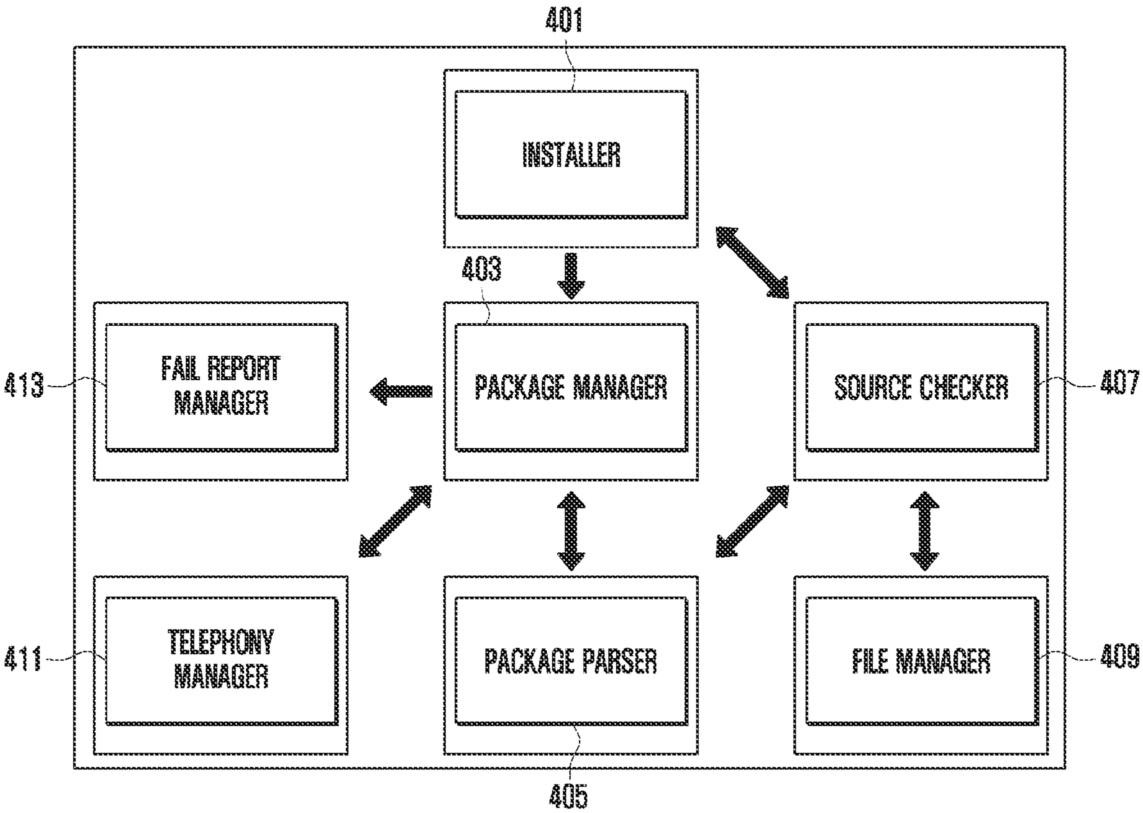
FIG. 4 is a block diagram illustrating an example configuration of an electronic device according to various embodiments.

FIG. 4 is a block diagram illustrating an example configuration of an electronic device according to various embodiments.

According to various embodiments, an electronic device (e.g., the electronic device 300 of FIG. 3) may include an installer 401, a package manager 403, a package parser 405, a source checker 407, a file manager 409, a telephony manager 411, and a fail report manager 413, each of which may include various circuitry and/or executable program instructions.

The components illustrated in FIG. 4 may be software components operating on the processor 310 of the electronic device 300. According to various embodiments, the components illustrated in FIG. 4 may be implemented into separate hardware components. The installer 401, the package manager 403, the package parser 405, the source checker 407, the file manager 409, the telephony manager 411, and the fail report manager 413 may be software components and be operated on the processor 310 of the electronic device 300.

The installer 401 may control to install an android application package (APK) in the electronic device 300. According to an embodiment, the installer 401 may include a store app such as Play Store or Galaxy Store, and a type of store apps in which the installer 401 may include is not limited to this. Further, the installer 401 may include a link (e.g., browser) to download a file or a file management app within the electronic device 300. Alternatively, the installer 401 may include an Android debug bridge (adb). The Android debug bridge may refer, for example, to a debugging tool operating on the Android system.

When an android application package (APK) is installed in the electronic device 300, the package manager 403 may control to register information on the application in the electronic device 300. Alternatively, the package manager 403 may control to delete the application information from the electronic device 300 when the application package is deleted from the electronic device 300.

The package parser 405 may access at least some files of a plurality of files included in the android application package (APK) in an installation process of the android application package (APK) and extract data from the accessed files. For example, the package parser 405 may control to acquire authorization information of an android application package (APK) internal file (e.g., androidmanifest.xml) or to insert an android application package (APK) internal file into a specific DB. The electronic device 300 may proceed the application installation process with reference to a specific DB into which authorization information is inserted. According to an embodiment, the package parser 405 may transmit source information to the source checker 407 corresponding to identifying whether source information intended by the developer exists in the android application package (APK).

The source checker 407 may compare the source information configured by the developer received from the package parser 405 with source information in a process of installing an actual android application package (APK). Hereinafter, the source information configured by the developer may be referred to as 'developer source information' or 'first identification information', and the source information in the process of installing the actual android application package (APK) may be referred to as 'terminal source information', 'app source information', or 'second identification information' identified through the electronic device. The source checker 407 may compare the source information (hereinafter, developer source information) configured by the developer with the source information (hereinafter, terminal source information) acquired in the process of installing the actual android application package (APK) to control the application installation process. For example, the electronic device 300 may determine whether to install the application so that the application is installed or not through a specific store using the source information of the application.

The source checker 407 may control the application installation process based on source information configured by the developer, which controls the application to be installed or not through a specific store. For example, the source checker 407 may compare the source information configured by the developer with the source information acquired in the process of installing the application package, and allow the application to be installed in the electronic device 101 based on the source information configured by the developer matching the source information acquired in the process of installing the application package. Alternatively, the source checker 407 may compare the source information configured by the developer with the source information acquired in the process of installing the application package, and prevent the application from being installed in the electronic device 101 based on the source information configured by the developer mismatching the source information acquired in the process of installing the application package. Hereinafter, the source information configured by the developer may be referred to as first identification information.

The file manager 409 may store or manage information including a download path of the android application package (APK). For example, in the case that an android application package (APK) is downloaded through a link (e.g., browser), the file manager 409 may insert information including a creation and/or download path of an android application package (APK) into a DB thereof.

The telephony manager 411 may acquire country information or a country code in which the android application package (APK) was downloaded based on information on a universal subscriber identity module (USIM) connected to the electronic device 300.

In the case that installation of the application fails because the developer source information and the terminal source information is different, the fail report manager 413 may control an error message (e.g., <You can download the latest version of this application from the link below>, <Installation of this application is not possible in that store>) pre-configured by the developer to be displayed on the electronic device 300.

Figure 5:
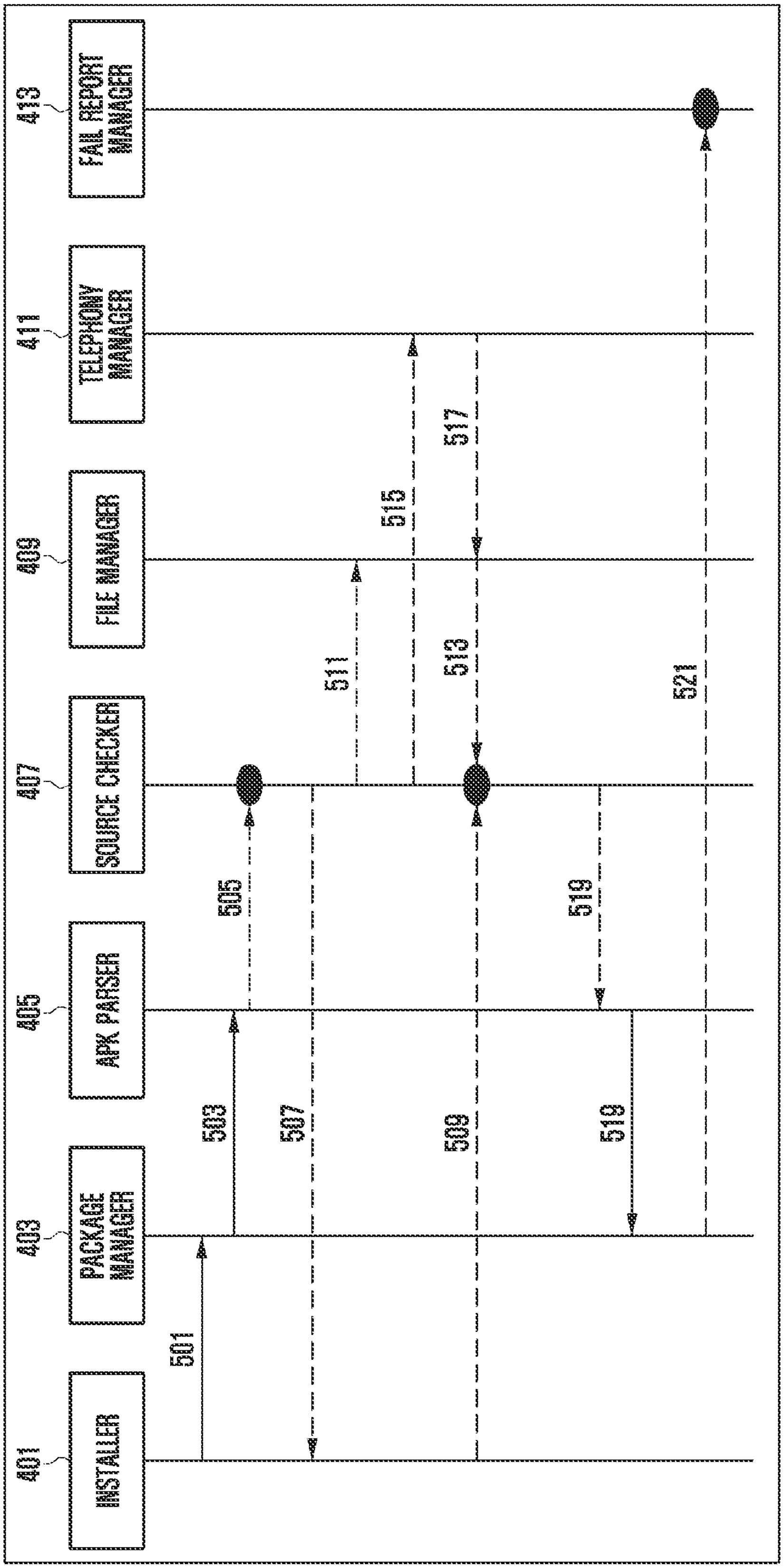
FIG. 5 is a message flow diagram illustrating an example method for an electronic device to generate authentication information when installing an application package according to various embodiments.

FIG. 5 is a message flow diagram illustrating an example method for an electronic device to generate authentication information when installing an application package according to various embodiments.

Operations described with reference to FIG. 5 may be implemented based on instructions that may be stored in a computer recording medium or memory (320 of FIG. 3). The method 500 illustrated in FIG. 5 may be executed by the electronic device (e.g., the electronic device 300 of FIG. 3) previously described with reference to FIGS. 1 to 4, and the technical features described above may not be repeated here.

The installer 401, the package manager 403, the package parser 405, the source checker 407, the file manager 409, the telephony manager 411, and the fail report manager 413 may be software components and be operated on the processor 310 of the electronic device 300.

In operation 501, the installer 401 may identify an installation event or installation request of the application and request installation of the application to the package manager 403.

In operation 503, the package manager 403 may request the package parser 405 to extract android application package (APK) information of an application to be installed.

In operation 505, the package parser 405 may read a file in the android application package (APK) corresponding to a request for extracting android application package (APK) information transmitted from the package manager 403, and collect information necessary for installation of the application. In this case, the package parser 405 may transmit developer source information to the source checker 407 corresponding to identifying that the developer source information is included in the android application package (APK). Developer source information may refer, for example, to source information configured by the developer, and this has been described with reference to FIG. 4.

The source checker 407 may identify whether a path in which the application is actually downloaded matches the developer's intention based on the developer source information received from the package parser 405. For example, in the case that the developer source information includes information on the installer that installs the application, the source checker 407 may request information to the installer 401 in operation 507. Thereafter, the source checker may receive information related to the installer that installs the application in operation 509. According to an embodiment, the installer 401 may include a store app such as Play Store or Galaxy Store, and types of store apps in which the installer 401 may include are not limited to this. The electronic device 300 may determine so that a specific application is installed or not using a specific installer based on developer source information. In this case, the processor (e.g., the processor 310 of FIG. 3) may acquire information on the installer that installs the application through operations 507 and 509.

In operation 511, the source checker 407 may request information on a link (e.g., the web browser 343 of FIG. 3) in which the file was downloaded to the file manager 409. Here, the web browser 343 may refer, for example, to one of paths in which the application was downloaded. The web browser 343 may be included in an external server (e.g., the external server 341 of FIG. 3). In operation 513, the source checker 407 may acquire information on the link (e.g., the web browser 343) in which the application was downloaded from the file manager 409. In the case that the developer source information received from the package parser 405 includes information on the link, the source checker 407 may control to proceed operations 511 and 513. For example, the processor (e.g., the processor 310 of FIG. 3) may configure to install a specific application only in the case that a specific application is downloaded through a specific link or to block installation of the application in the case that the specific application is downloaded from a specific link. In this case, the processor 310 may acquire information on the link in which the application was downloaded through operations 511 and 513.

The source checker 407 may request and acquire information on the country in which the application was downloaded to and from the telephony manager 411 in operations 515 and 517. In the case that the developer source information received from the package parser 405 includes information on the country in which the application was downloaded, the source checker 407 may control to proceed operations 515 and 517. For example, the processor 310 may configure to install a specific application only in the case that the specific application is downloaded in a specific country, or to block installation of the application in the case that the specific application is downloaded in a specific country. In this case, the processor (e.g., the processor 310 of FIG. 3) may acquire information on the country in which the application was downloaded through operations 515 and 517.

The source checker 407 may receive developer source information from the package parser 405, and proceed operations 507 and 509 in the case that the developer source information includes information on the installer that installs the application to acquire information on the installer that proceeds installation of the application.

Further, in the case that the developer source information includes information on the link in which the application was downloaded, the source checker 407 may perform operations 511 and 513 to acquire information on the link in which the application was downloaded.

Further, in the case that the developer source information includes information on the country in which the application was downloaded, the source checker 407 may perform operations 515 and 517 to acquire information on the country in which the application was downloaded.

The source checker 407 may transmit information related to installation of the application (e.g., whether installation of the application has failed) to the package manager 403 in operation 519. The package manager 403 may receive information related to installation of the application from the source checker 407, and transmit the reason for installation failure of the application (e.g., in the case that the application is not downloaded using a specific application store 341) to the fail report manager 413 in the case that installation of the application has failed. In this case, the source checker 407 may compare the developer source information and the terminal source information to control the application installation process.

According to an embodiment, there may be various paths in which an android application package (APK) is introduced into the electronic device 300. The electronic device 300 may identify whether the android application package (APK) was downloaded through an installation path not intended by the developer using developer source information including a target (e.g., app store, link, and the like) to upload the android application package (APK). The electronic device according to various embodiments of the disclosure may control the developer to input source information to the android application package (APK), compare the source information with source information of the actually downloaded android application package (APK), and control to originally block installation attempts through a path different from the developer's intention.

Figure 6A:
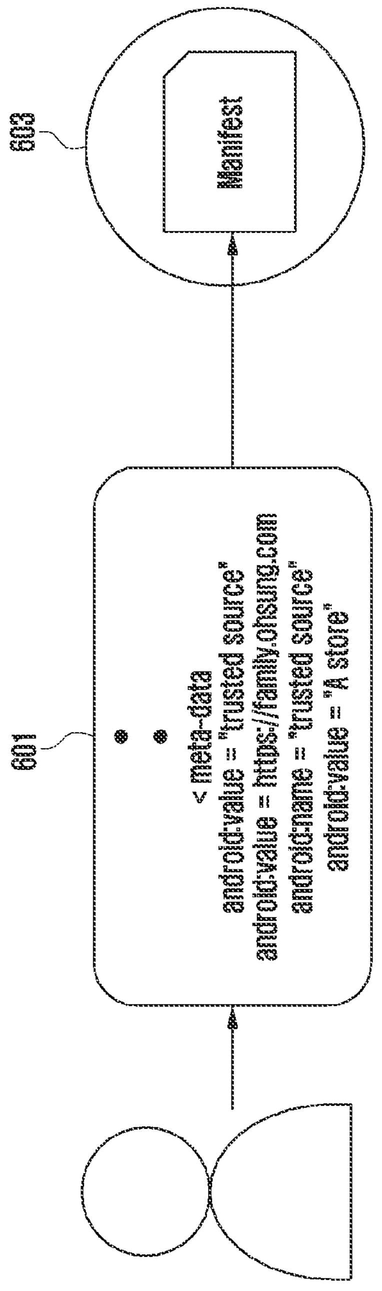
FIGS. 6A, 6B, 6C and 6D are diagrams illustrating an example method of managing an application package of an electronic device according to various embodiments.

FIG. 6A is a diagram illustrating an example process of inserting developer source information into an electronic device according to various embodiments.

With reference to FIG. 6A, an electronic device (e.g., the electronic device 300 of FIG. 3) may include developer source information 601 configured by an application developer. The source information 601 may be included in an android application package (APK). The source information 601 configured by the developer may be indicated as 'developer source information' or 'first identification information', as previously described with reference to FIG. 4. The type of the developer source information 601 will be described in greater detail below with reference to FIG. 6B.

According to an embodiment, the developer source information 601 may be inserted or included in a file whose configuration may be changed by the developer when creating an android application package (APK). For example, the developer source information 601 may be inserted or included in a manifest file 603 whose configuration may be changed by the developer. The manifest file 603 may refer, for example, to a file with the extension of androidmanifest.xml. The manifest file 603 is only an example, and a part in which the developer source information 601 may be inserted in the android application package (APK) creation process is not limited to the manifest file 603, and may include any part in which developers may directly change the configuration or any file in which developers may directly change the configuration.

Figure 6B:
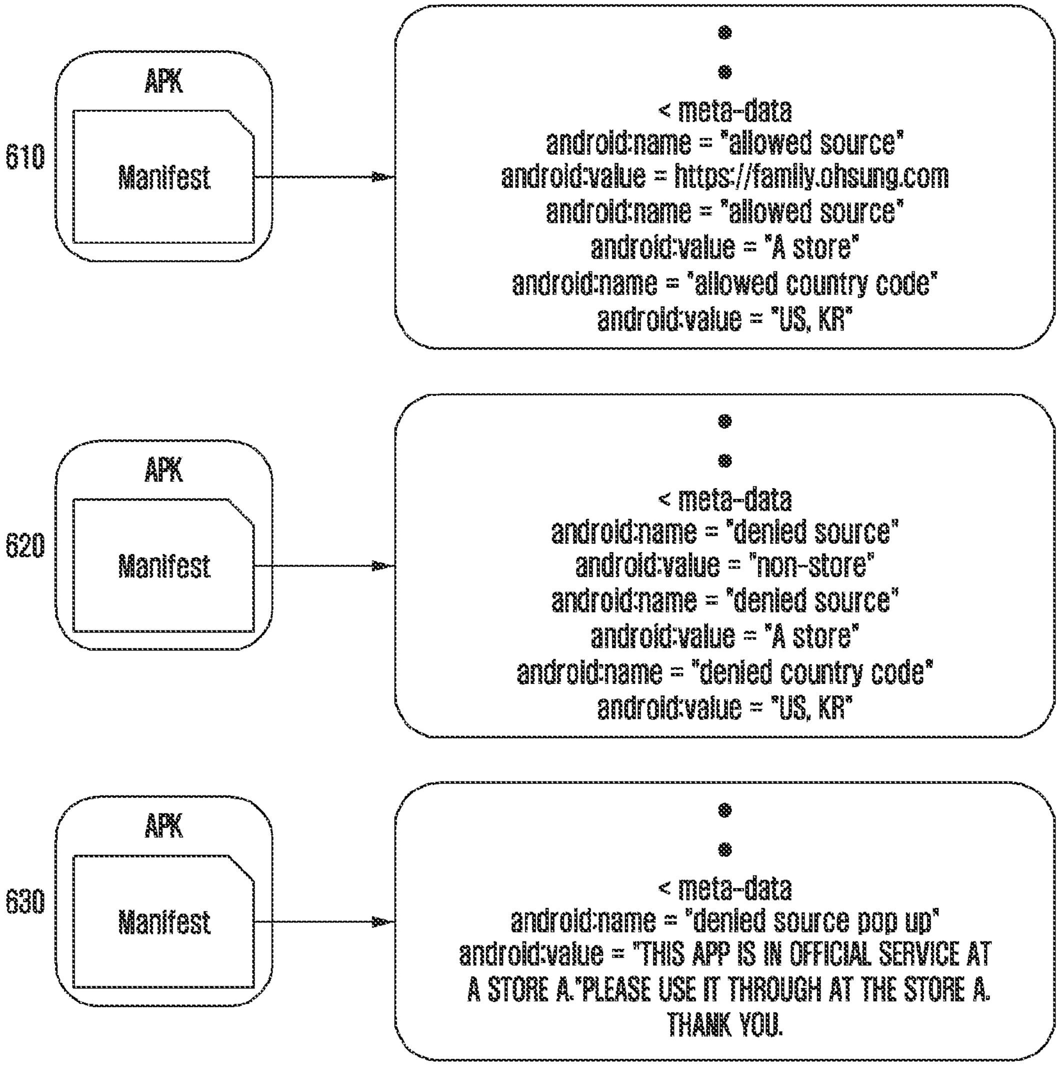

FIG. 6B is a diagram illustrating various example types of developer source information according to various embodiments.

With reference to 610 of FIG. 6B, the electronic device 300 may configure at least one of a type of an installer (e.g., the application store 345 of FIG. 3) that installs an application and a type of a link (e.g., the external server 341 or the web browser 343 of FIG. 3) to download the application, or a type (e.g., KR, US) of countries download to the application as developer source information. For example, the electronic device 300 may configure a type of installer to allow installation of the application to a store A, configure a link to allow installation of the application to https://family.ohsung.com, and configure a country to allow installation of the application to US and KR. In this case, the electronic device 300 may control the downloaded file to be installed within the electronic device 300 corresponding to identifying whether the downloaded file was downloaded using the store A or a link of https://family.ohsung.com. The installer to allow installation of the application and the link to allow installation of the application may be applied as an OR condition, whereas a country condition to allow installation of the application may be applied as an AND condition. That is, in the case that the downloaded file is downloaded using the store A or a link of https://family.ohsung.com, the electronic device 300 may allow installation of the downloaded file in the electronic device 300, and in the case that the downloaded file is downloaded from a country other than US and KR, the electronic device 300 may not allow installation of the downloaded file in the electronic device 300. This is only an example of applying developer source information, and the AND condition or OR condition is not fixed, and application conditions for developer source information may vary according to the developer's configuration.

According to an embodiment, the source checker 407 of FIG. 4 may compare the configured developer source information (e.g., the source information 601 of FIG. 6A) and a source when the application is actually downloaded to the electronic device 300. Source information when the application is downloaded to the electronic device 300 may be indicated as 'terminal source information' or 'second identification information', as previously described with reference to FIG. 4.

In the case of 610 of FIG. 6B, the source checker 407 may identify installer information in the terminal source information and identify whether the application was downloaded through the store A. Further, the source checker 407 may identify link information on the terminal source information and identify whether the application was downloaded from https://family.ohsung.com. Further, the source checker 407 may identify country information or country code in the terminal source information and identify whether the application was downloaded from US or KR. The source checker 407 may control the application to be installed in the electronic device (e.g., the electronic device 300 of FIG. 3) corresponding to identifying that the installer, link, and country information all match. In the case that any one of the installer, link, and country information does not match, the source checker 407 may control the application not to be installed in the electronic device 300. This may be understood as a situation in which installer, link, and country information are applied as an AND condition.

In the case that the link information matches even if the installer information does not match, the source checker 407 may allow installation of the application, and conversely, in the case that the installer information matches even if the link information does not match, the source checker 407 may allow installation of the application. This may be understood as a situation in which installer information and link information is applied as an OR condition and in which country information is applied as an AND condition.

According to an embodiment, the electronic device 300 may provide, to the user, a guide on whether installation has failed because which specific information among installer, link, and country information does not match. This is only one example, and the installer, link, and country information in which the developer may configure is not limited to what is described above.

With reference to 620 of FIG. 6B, the developer may configure at least one of a type of an installer that installs the application, a type of a link to download the application, or a type of country to download the application as developer source information. For example, the developer may configure so that an application that is not downloaded from the store is not installed in the electronic device 300. In this case, the processor (e.g., the processor 310 of FIG. 3) may control an application downloaded through a link other than the app store not to be installed in the electronic device 300. Further, the developer may configure so that the application downloaded from the store A is not installed within the electronic device 300. Further, the developer may configure so that an application downloaded in a specific country (e.g., US and KR) is not installed in the electronic device 300. In the case that any one of the installer, link, and country information corresponds to the installation failure condition configured by the developer, the source checker 407 may control the application not to be installed in the electronic device 300, and provide, to the user, a guide on whether installation of the application has failed according to which specific information of the installer, link, and country information corresponding to the installation failure condition, as illustrated with reference to 630 of FIG. 6B.

Figure 6C:
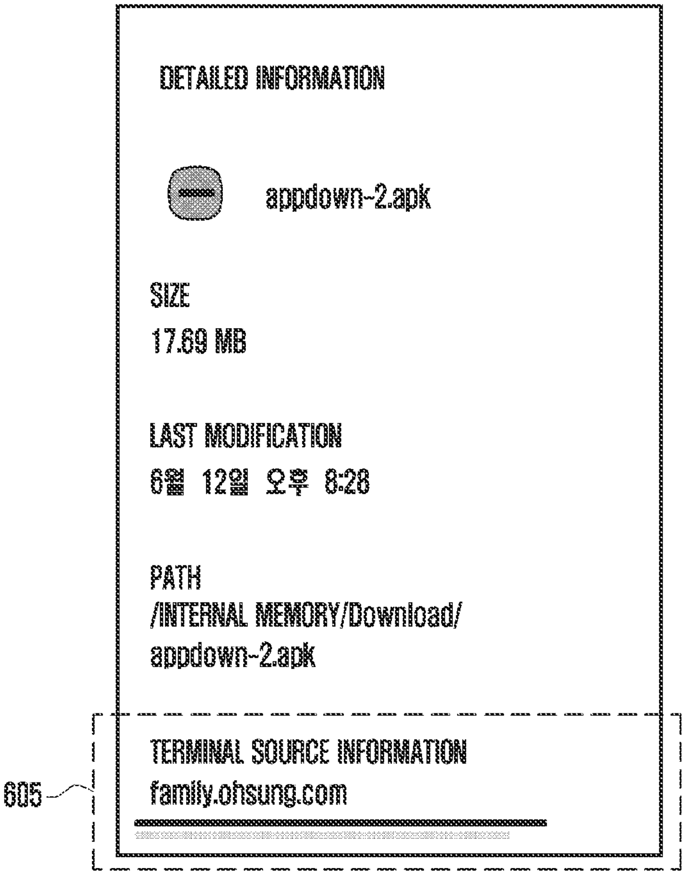

FIG. 6C is a diagram illustrating an example process of identifying terminal source information according to various embodiments. FIG. 6C illustrates a situation in which the electronic device 300 downloads an android application package (APK) from a specific link (e.g., family.ohsung.com). In this case, terminal source information 605 in the electronic device 300 may include a link (e.g., family.ohsung.com) in which the android application package (APK) is downloaded. This is only an example, and the terminal source information 605 is not limited to this. For example, the terminal source information 605 may be indicated as 'app source information' or 'sender' according to the source information. The electronic device 300 may display together a link in which the android application package (APK) is downloaded in an area indicated with at least one of 'terminal source information', 'app source information', or 'sender'.

Figure 6D:
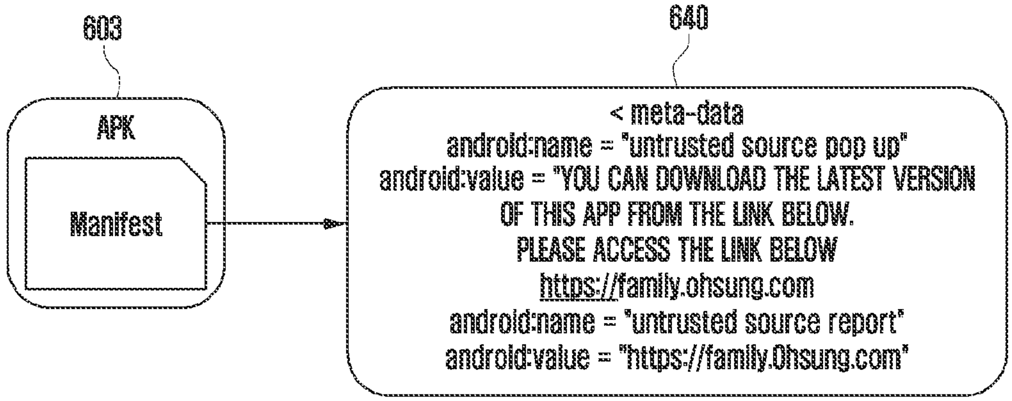

FIG. 6D is a diagram illustrating an example operation of guiding the reason for application installation failure to a user in the case that developer source information and terminal source information does not match in an electronic device according to various embodiments.

For example, the developer may configure to allow installation of an application in the electronic device 300 only in the case that the application is downloaded through a specific link (e.g., family.ohsung.com). In the case that a user downloads an application through a path other than the link configured by the developer and attempts to install the application in the electronic device 300, the processor 310 may provide a guide 640 preconfigured by the developer to the user. The user may identify whether the application is installed and the reason for failure using the guide 640 preconfigured by the developer, and identify that the reason for failure is a problem of the source (e.g., download path) rather than a problem inside the electronic device 300. The user may download again the application through a specific link using the guide 640 preconfigured by the developer and install the application in the electronic device 300.

The source checker 407 may compare 'developer source information' with 'terminal source information' to generate authentication information including whether installation is allowed or failed, and transmit the authentication information to the package manager 403. The package manager 403 may control installation of an android application package (APK) corresponding to identifying authentication information transmitted from the source checker 407. In general, the reason for installation failure may be recorded in a log within the electronic device 300, and in the case that installation of an application has failed according to a policy configured by the developer, the electronic device 300 according to various embodiments of the disclosure may explicitly guide the reason for installation failure to the user and guide to change the download path. The developer may insert 'developer source information' into the android application package (APK) and insert together a message according to installation failure into the android application package (APK). For example, the developer may configure developer source information 601 so that an application may be downloaded from a designated server through a link and installed in the electronic device. In this case, in the case that the electronic device 300 attempts to install an application downloaded to a path different from the source configured by the developer, the electronic device 300 may pre-register a message 640 (e.g., <You can download the latest version of this application from the link below>, <Installation of this application is not possible in that store>) to accurately transmit the reason for installation failure (e.g., in the case that the application is not downloaded using a specific application store 341) to the user.

An electronic device according to various example embodiments may include: a communication interface comprising communication circuitry, a memory, and at least one processor, comprising processing circuitry, wherein at least one processor, individually and/or collectively, may be configured to: acquire first identification information written on an application package in a process of creating the application package, acquire second identification information that may have different values according to a download path of the application package, generate authentication information based on the first identification information and the second identification information, and control installation of the application based on the authentication information.

According to an example embodiment, the first identification information may include at least one of installer information corresponding to whether the application is installed using a specific installer, link information corresponding to whether the application is downloaded through an external server or a specific web browser, or country information corresponding to whether the application is downloaded when the electronic device is located in a specific country.

According to an example embodiment, the installer information may include information indicating an app store used in an application installation process.

According to an example embodiment, the second identification information may include a download path of an application package received using a communication interface.

According to an example embodiment, the download path of the application package may include at least one of installer information corresponding to whether the application is installed using a specific installer, link information corresponding to whether the application is downloaded through an external server or a specific web browser, or country information corresponding to whether the application is downloaded when the electronic device is located in a specific country.

According to an example embodiment, at least one processor, individually and/or collectively, may be configured to: compare installer information on the first identification information with installer information on the second identification information corresponding to identifying that the first identification information includes installer information corresponding to whether the application is installed using a specific installer, and control the electronic device to allow installation of the application corresponding to the installer information on the first identification information matching the installer information on the second identification information.

According to an example embodiment, at least one processor, individually and/or collectively, may be configured to control the electronic device to not allow installation of the application corresponding to installer information based on the first identification information mismatching installer information on the second identification information.

According to an example embodiment, at least one processor, individually and/or collectively, may guide that installation of the application is not possible because the installer information does not match, and guide an appropriate installation path to enable installation of the application.

According to an example embodiment, at least one processor, individually and/or collectively, may be configured to: compare link information on the first identification information with link information on the second identification information corresponding to identifying that the first identification information includes link information corresponding to whether the application is downloaded through an external server or a specific web browser, and control the electronic device to allow installation of the application corresponding to the link information on the first identification information matching the link information on the second identification information.

According to an example embodiment, at least one processor, individually and/or collectively, may be configured to control the electronic device to not allow installation of the application corresponding to link information based on the first identification information mismatching link information on the second identification information.

According to an example embodiment, at least one processor, individually and/or collectively, may be configured to guide that installation of the application is not possible because the link information does not match and guide an appropriate installation path to enable installation of the application.

According to an example embodiment, at least one processor, individually and/or collectively, may be configured to: compare country information in the first identification information with country information in the second identification information corresponding to identifying that the first identification information includes country information, and control the electronic device to allow installation of the application corresponding to the country information in the first identification information matching the country information in the second identification information.

According to an example embodiment, at least one processor, individually and/or collectively, may be configured to control the electronic device to not allow installation of the application corresponding to the country information in the first identification information mismatching the country information in the second identification information.

According to an example embodiment, at least one processor, individually and/or collectively, may be configured to guide that installation of the application is not possible because the country information does not match and guide an appropriate installation path to enable installation of the application.

A method of managing an application package for an electronic device according to various example embodiments may include: acquiring first identification information written on an application package, acquiring second identification information that may have different values according to a download path of the application package, generating authentication information based on the first identification information and the second identification information, and controlling installation of the application based on the authentication information.

According to an example embodiment, generating authentication information based on the first identification information and the second identification information may include: comparing installer information on the first identification information with installer information on the second identification information corresponding to identifying that the first identification information includes installer information corresponding to whether the application is installed using a specific installer.

According to an example embodiment, controlling installation of an application based on authentication information may further include: controlling the electronic device to allow installation of the application corresponding to the installer information on the first identification information matching the installer information on the second identification information, controlling the electronic device to not allow the installation of the application corresponding to the installer information in the first identification information not matching the installer information in the second identification information, guiding that installation of the application is not possible because the installer information does not match, and guiding an appropriate installation path to enable installation of the application.

According to an example embodiment, generating authentication information based on the first identification information and the second identification information may include: comparing link information on the first identification information with link information on the second identification information corresponding to identifying that the first identification information includes link information corresponding to whether the application is downloaded through an external server or a specific web browser.

According to an example embodiment, controlling installation of an application based on authentication information may further include: controlling the electronic device to allow installation of the application corresponding to the link information on the first identification information matching the link information on the second identification information, controlling the electronic device to not allow installation of the application corresponding to the link information in the first identification information not matching the link information in the second identification information, guiding that installation of the application is not possible because the link information does not match, and guiding an appropriate installation path to enable installation of the application.

According to an example embodiment, generating authentication information based on the first identification information and the second identification information may include: comparing country information on first identification information with country information on the second identification information corresponding to identifying that the first identification information includes country information.

According to an example embodiment, controlling installation of the application based on authentication information may further include: controlling the electronic device to allow installation of the application corresponding to the country information on the first identification information matching the country information on the second identification information, controlling the electronic device to not allow installation of the application corresponding to the country information in the first identification information not matching the country information in the second identification information, guiding that installation of the application is not possible because the country information does not match, and guiding an appropriate installation path to enable installation of the application.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a communication interface comprising communication circuitry;

memory; and at least one processor, comprising processing circuitry, memory storing instructions which, when executed by the at least one processor, individually and/or collectively, cause the electronic device to:

acquire first identification information written on an application package in a process of creating the application package, acquire second identification information including a download path of the application package, generate authentication information based on the first identification information and the second identification information, and control installation of an application based on the authentication information.

2. The electronic device of claim 1, wherein the first identification information comprises at least one of installer information corresponding to whether the application is installed using a specific installer, link information corresponding to whether the application is downloaded through an external server or a specific web browser, or country information corresponding to whether the application is downloaded based on the electronic device being located in a specific country.

3. The electronic device of claim 2, wherein the installer information comprises information indicating app store used in an installation process of the application.

4. The electronic device of claim 1, wherein the second identification information comprises a download path of the application package received using the communication interface.

5. The electronic device of claim 4, wherein the download path of the application package comprises at least one of installer information corresponding to whether the application is installed using a specific installer, link information corresponding to whether the application is downloaded through an external server or a specific web browser, or country information corresponding to whether the application is downloaded based on the electronic device being located in a specific country.

6. The electronic device of claim 1, wherein the instructions, when executed by the processor, further cause the electronic device to:

compare installer information on the first identification information with installer information on the second identification information corresponding to identifying that the first identification information includes installer information corresponding to whether the application is installed using a specific installer, and control the electronic device to allow installation of the application corresponding to the installer information based on the first identification information matching the installer information on the second identification information.

7. The electronic device of claim 6, wherein the instructions, when executed by the processor, further cause the electronic device to: control the electronic device to not allow installation of the application corresponding to the installer information based on the first identification information not matching the installer information on the second identification information.

8. The electronic device of claim 7, wherein the instructions, when executed by the processor, further cause the electronic device to: guide that installation of the application is not possible because the installer information does not match, and guide an appropriate installation path to enable installation of the application.

9. The electronic device of claim 1, wherein the instructions, when executed by the processor, further cause the electronic device to:

compare link information on the first identification information with link information on the second identification information corresponding to identifying that the first identification information includes link information corresponding to whether the application is downloaded through an external server or a specific web browser, and control the electronic device to allow installation of the application corresponding to the link information based on the first identification information matching the link information on the second identification information.

10. The electronic device of claim 9, wherein the instructions, when executed by the processor, further cause the electronic device to: control the electronic device to not allow installation of the application corresponding to the link information based on the first identification information not matching the link information on the second identification information.

11. The electronic device of claim 10, wherein the instructions, when executed by the processor, further cause the electronic device to: guide that installation of the application is not possible because the link information does not match, and guide an appropriate installation path to enable installation of the application.

12. The electronic device of claim 1, wherein the instructions, when executed by the processor, further cause the electronic device to:

compare country information on the first identification information with country information on the second identification information corresponding to identifying that the first identification information includes the country information, and control the electronic device to allow installation of the application corresponding to the country information based on the first identification information matching the country information on the second identification information.

13. The electronic device of claim 12, wherein the instructions, when executed by the processor, further cause the electronic device to: control the electronic device to not allow installation of the application corresponding to the country information on the first identification information not matching the country information on the second identification information.

14. The electronic device of claim 13, wherein the instructions, when executed by the processor, further cause the electronic device to: guide that installation of the application is not possible because the country information does not match, and guide an appropriate installation path to enable installation of the application.

15. A method of managing an application package for an electronic device, the method comprising:

acquiring first identification information written on the application package;

acquiring second identification information including a download path of the application package;

generating authentication information based on the first identification information and the second identification information; and controlling installation of an application based on the authentication information.

16. The method of claim 15, wherein the first identification information comprises at least one of installer information corresponding to whether the application is installed using a specific installer, link information corresponding to whether the application is downloaded through an external server or a specific web browser, or country information corresponding to whether the application is downloaded when the electronic device is located in a specific country.

17. The method of claim 15, wherein the second identification information comprises a download path of the application package received using a communication interface, and the download path of the application package comprises at least one of installer information corresponding to whether the application is installed using a specific installer, link information corresponding to whether the application is downloaded through an external server or a specific web browser, or country information corresponding to whether the application is downloaded when the electronic device is located in a specific country.

18. The method of claim 15, wherein generating authentication information based on the first identification information and the second identification information comprises: comparing installer information on the first identification information with installer information on the second identification information corresponding to identifying that the first identification information includes installer information corresponding to whether the application is installed using a specific installer, and controlling installation of an application based on the authentication information further comprises:

controlling the electronic device to allow installation of the application corresponding to the installer information based on the first identification information matching the installer information on the second identification information;

controlling the electronic device to not allow installation of the application corresponding to the installer information based on the first identification information not matching the installer information on the second identification information; and guiding that installation of the application is not possible because the installer information does not match and guiding an appropriate installation path to enable installation of the application.

19. The method of claim 15, wherein generating authentication information based on the first identification information and the second identification information comprises: comparing link information on the first identification information with link information on the second identification information corresponding to identifying that the first identification information includes link information corresponding to whether the application is downloaded through an external server or a specific web browser, and controlling installation of an application based on the authentication information further comprises:

controlling the electronic device to allow installation of the application corresponding to the link information based on the first identification information matching the link information on the second identification information;

controlling the electronic device to not allow installation of the application corresponding to the link information based on the first identification information not matching the link information on the second identification information; and guiding that installation of the application is not possible because the link information does not match, and guiding an appropriate installation path to enable installation of the application.

20. The method of claim 15, wherein generating authentication information based on the first identification information and the second identification information comprises: comparing country information on the first identification information with country information on the second identification information corresponding to identifying that the first identification information includes the country information, and controlling installation of an application based on the authentication information further comprises:

controlling the electronic device to allow installation of the application corresponding to the country information based on the first identification information matching the country information on the second identification information;

controlling the electronic device to not allow installation of the application corresponding to the country information based on the first identification information not matching the country information on the second identification information; and guiding that installation of the application is not possible because the country information does not match and guiding an appropriate installation path to enable installation of the application.

* * * * *